United States Patent [19]

Gooch et al.

[11] Patent Number: 5,529,609
[45] Date of Patent: Jun. 25, 1996

[54] AIR CLEANER HAVING A THREE DIMENSIONAL VISCO-ELASTIC MATRIX OF MATERIAL

[75] Inventors: Jan W. Gooch, Atlanta; Charlene W. Bayer, Norcross, both of Ga.

[73] Assignee: Georgia Tech Research Corporation, Atlanta, Ga.

[21] Appl. No.: 335,661

[22] Filed: Nov. 7, 1994

[51] Int. Cl.⁶ .......................... B01D 53/02; B01D 53/14
[52] U.S. Cl. ............... 95/90; 95/116; 95/141; 95/143; 95/273; 95/285; 96/153; 96/154; 55/279; 55/518; 55/524; 55/528
[58] Field of Search .................. 95/90, 116, 117, 95/141, 143–147, 273, 274, 285; 96/108, 153, 154; 55/515, 516, 518, 524, 527, 528, DIG. 24, 279

[56] References Cited

U.S. PATENT DOCUMENTS

| | | | |
|---|---|---|---|
| Re. 31,849 | 3/1985 | Klein | 55/389 |
| 2,751,040 | 6/1956 | Hanly et al. | 183/44 |
| 2,774,690 | 12/1956 | Cockett et al. | 55/DIG. 24 |
| 2,784,132 | 3/1957 | Maisel | 55/527 X |
| 2,888,095 | 5/1959 | Perrini et al. | 55/528 X |
| 3,025,233 | 3/1962 | Figert | 210/502 |
| 3,154,393 | 10/1964 | Klein et al. | 55/528 X |
| 3,284,361 | 11/1966 | Rocchini et al. | 55/DIG. 24 |
| 3,366,582 | 1/1968 | Adams et al. | 260/2.5 |
| 3,577,707 | 5/1971 | White | 55/528 X |
| 3,815,341 | 6/1974 | Hamano | 55/528 X |
| 3,925,248 | 12/1975 | Moroni et al. | 252/428 |
| 4,074,724 | 2/1978 | Morie et al. | 131/267 |
| 4,160,059 | 7/1979 | Samejima | 428/288 |
| 4,239,516 | 12/1980 | Klein | 55/528 X |
| 4,431,542 | 2/1984 | Dingfors et al. | 55/528 X |
| 4,519,816 | 5/1985 | Clarke | 55/528 X |
| 4,534,775 | 8/1985 | Frazier | 55/74 |
| 4,540,625 | 9/1985 | Sherwood | 55/524 X |
| 4,565,727 | 1/1986 | Giglia et al. | 55/528 X |
| 4,604,110 | 8/1986 | Frazier | 55/74 |
| 4,655,807 | 4/1987 | Ohmori et al. | 55/528 X |
| 4,784,892 | 11/1988 | Storey et al. | 55/528 X |
| 4,793,837 | 12/1988 | Pontius | 55/316 |
| 4,973,837 | 11/1990 | Pontius | 55/524 X |
| 4,983,192 | 1/1991 | von Blücher et al. | 55/528 X |
| 4,983,193 | 1/1991 | Tani et al. | 55/528 X |
| 5,100,445 | 3/1992 | Johnson et al. | 55/518 X |
| 5,219,469 | 6/1993 | Binzer et al. | 55/528 X |
| 5,283,106 | 2/1994 | Seiler et al. | 55/528 X |
| 5,284,704 | 2/1994 | Kochesky et al. | 55/528 X |
| 5,338,340 | 8/1994 | Kasmark, Jr. et al. | 55/524 X |
| 5,346,565 | 9/1994 | White | 55/528 X |
| 5,350,443 | 9/1994 | von Blücher et al. | 55/527 X |
| 5,360,654 | 11/1994 | Anderson et al. | 55/528 X |

FOREIGN PATENT DOCUMENTS

| | | | |
|---|---|---|---|
| 0701975 | 1/1954 | United Kingdom | 55/DIG. 24 |

*Primary Examiner*—Robert Spitzer
*Attorney, Agent, or Firm*—Hopkins & Thomas

[57] ABSTRACT

An air cleaner comprises a cleaning element having a three-dimensional visco-elastic matrix of material for adsorbing airborne particulate matter and for absorbing volatile liquids and a variety of noxious gases. The three-dimensional visco-elastic matrix of material adsorbs particulate matter of many types and sizes and advantageously draws the particulate matter below the surface of the material. To enhance the cleaning properties of the material, the three-dimensional visco-elastic matrix of material may additionally comprise a zeolite to improve the absorption of gases and a metallic additive, such as copper sulfate, to inhibit biological activity. The material forming the three-dimensional visco-elastic matrix may be acrylamide, siloxane, acrylate, or a cellulosic material and may be in the form of fibers or particles.

23 Claims, 5 Drawing Sheets

AIR CLEANER HAVING A THREE DIMENSIONAL VISCO-ELASTIC MATRIX OF MATERIAL

FIELD OF INVENTION

This invention generally relates to an apparatus for cleaning air and, more particularly, to an air cleaner having a three-dimensional visco-elastic matrix for efficiently and optimally cleaning air.

BACKGROUND OF THE INVENTION

The air which we breath typically contains a number of pollutants, such as particulate matter, volatile liquids, gases, and vapors. Because these pollutants, to varying degrees, can be harmful when inhaled, air cleaners in the industry have been designed to remove at least some of them.

One commonly used air cleaner in the industry is designed primarily to filter out the particulate matter from the air. This filter removes the particulate matter from the air by forcing the air through a filter medium or septum, which blocks the particulate matter. The filter medium may be comprised of a variety of materials, such as glass fibers, wire screens, steel wool, animal hair or hemp fibers. This type of air filter can remove such particulate matter as dust or pollen as long as the particulate matter is larger than the openings in the filter medium or septum and thus is effectively blocked by the medium while the air passes therethrough.

Most air filters in the industry are limited in the types of particulate matter that can be removed by the physical dimensions of the filter medium. The size of the openings in the filter medium must be large enough to allow air to circulate and pass through yet small enough to obstruct the particulate matter. Thus, if the openings are made smaller than a minimum opening size, the air flow is too restricted and the air filter becomes inoperable.

Also, because the typical air filter in the industry operates by obstructing the particulate matter, the proper operation of the air filter is limited in the amount of particulate matter that can be removed from a volume of air. Once the air filter obstructs that limited amount of particulate matter it becomes blocked and any further blockage by collected particulate matter will restrict or block the flow of air through the air filter and thereby render the air filter inoperable.

Another type of air filter in the industry is the active carbon filter. The active carbon filter contains activated carbon, which has a relatively high adsorption power and is therefore rather effective at removing certain gases from the air. The active carbon filter is also effective in removing certain odors from the air in addition to removing airborne particulate matter. The active carbon filter is commonly used to remove gaseous pollutants, such as those generated by cooking, body, and tobacco odors.

The active carbon filter, however, has several disadvantages. For instance, the activated carbon particles have a tendency to break down and form fine particles, which can then become dislodged from the filter element. The activated carbon particles can also shift in location and form open passageways through the filter where the air does not contact the activated carbon particles. Further, active carbon filters generally remove only certain odors from the air and leave many other odors and harmful gases unfiltered. Even for those gases which the active carbon filter can adsorb, the gases may become re-released from the filter into the air after the passage of time if the carbon filter is not cleaned.

An air filter disclosed in U.S. Pat. No. 4,604,110 of Frazier or in U.S. Pat. No. 4,534,775 of Frazier comprises a mixture of silica gel, activated carbon, and zeolite. The disclosed air filter may additionally comprise a liquid for inhibiting the growth of microorganisms. Thus, while the Frazier air filter still operates on the principle of obstruction it is able to trap a broader range of pollutants than previous air filters.

With the mixture of elements in the Frazier filter, the activated carbon is effective against non-polar compounds such as chlorinated hydrocarbons, aromatic compounds, and general organic compounds and is very effective against carbon tetrachloride, benzene, and toluene. The zeolite, or molecular sieve, has a relative small pore size and is effective against such compounds as hydrogen sulfide, alcohols, ester, and aldehydes. The silica gel has larger pores than the activated carbon and zeolite and is effective in removing long carbon chain compounds, such as organic acids.

Figure 1:
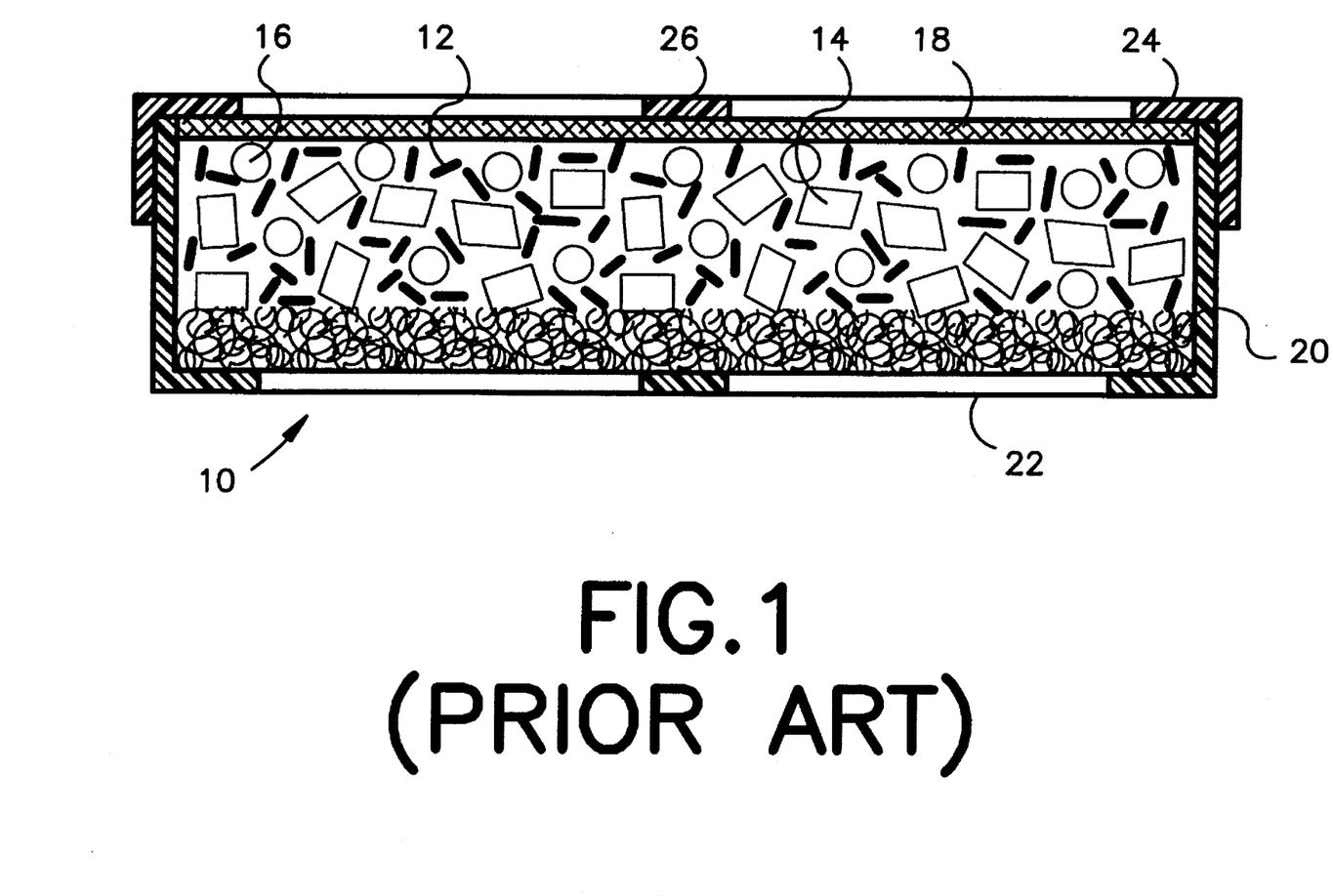
FIG. 1 is a cross-sectional view of a prior art filter element such as disclosed in the Frazier patents.

FIG. 1 illustrates an embodiment of the filter in U.S. Pat. No. 4,604,110 to Frazier. In this figure, a filter element 10 having a bottom portion 22 and a top portion 24 comprises a dry mixture of activated carbon particles 12, silica gel 14, and zeolite particles 16. The filter element 10 has a top layer 18 of high efficiency particulate removal paper and a bottom layer 20 of polyurethane foam. Air passes through ports 26 of the top and bottom portions. Frazier states that a liquid may be added to the mixture in order to inhibit the growth of microorganisms.

The filters disclosed in the patents to Frazier operate primarily by obstructing the particulate matter and therefore have the same disadvantages as air filters in general. Namely, such air filters are limited in the amounts and size of particulate matter that can be filtered out of the air since the filters must maintain a flow of air through the filter element. The air filters are also limited in the types of pollutants that can be removed from the air and are prone to the re-release of the pollutants back into the air.

SUMMARY OF THE INVENTION

It is a general object of the invention to overcome the disadvantages of the prior art air cleaners, as noted above and as generally known in the industry.

It is an object of the present invention to efficiently and effectively remove particulate matter from air.

It is an object of the present invention to remove particulate matter of a wide range of sizes from the air.

It is another object of the present invention to remove a broad range of gases and vapors from the air.

It is yet another object of the present invention to remove biological contaminants from the air and to inhibit biological growth from the removed contaminants.

It is a further object of the present invention to remove pollutants from the air without risk that the pollutants will be re-released back into the air.

The advantages and novel features of the invention are set forth in the description which follows, and will become readily apparent to those skilled in the art. To achieve the foregoing and other objects, in accordance with the present invention, in a preferred embodiment thereof, an air cleaner according to the present invention comprises a cleaning element that has a three-dimensional visco-elastic matrix which is preferably formed of acrylamide. The three-dimensional visco-elastic matrix cleans the air by adsorbing airborne particulate matter and absorbing select gases and volatile liquids.

Preferably, the three-dimensional visco-elastic matrix comprises additives to enhance the cleaning properties of the three-dimensional visco-elastic matrix. These additives may comprise, for example, a zeolite to absorb gases and a metallic additive to inhibit biological activity.

BRIEF DESCRIPTION OF THE DRAWINGS

The accompanying drawings, which are incorporated in, and form a part of, the specification, illustrate a preferred embodiment of the present invention and, together with the description, serve to illustrate and explain the principles of the invention. The drawings are not necessarily to scale, emphasis instead being placed upon clearly illustrating the principles of the invention. In the drawings.

DETAILED DESCRIPTION

Figure 2:
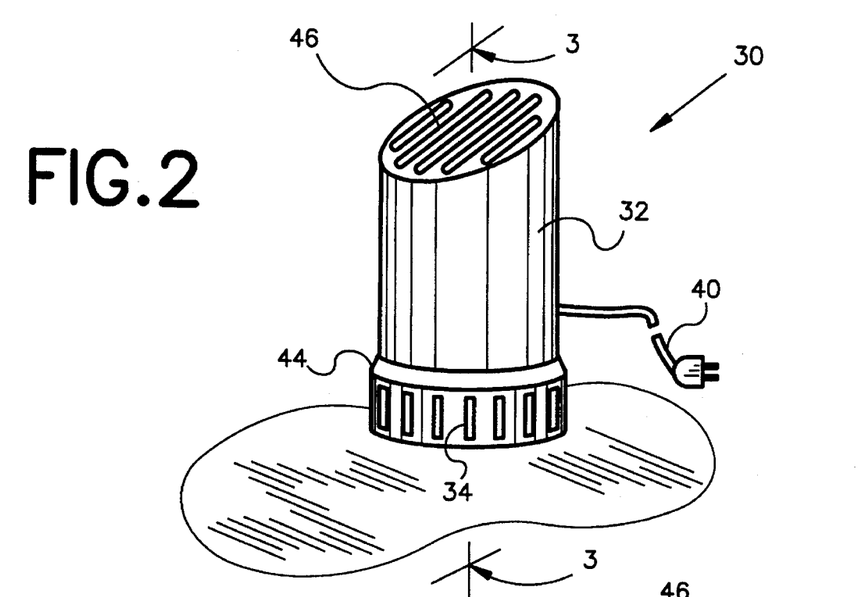
FIG. 2 is an elevation view of an air cleaner according to one embodiment of the invention.
Figure 3:
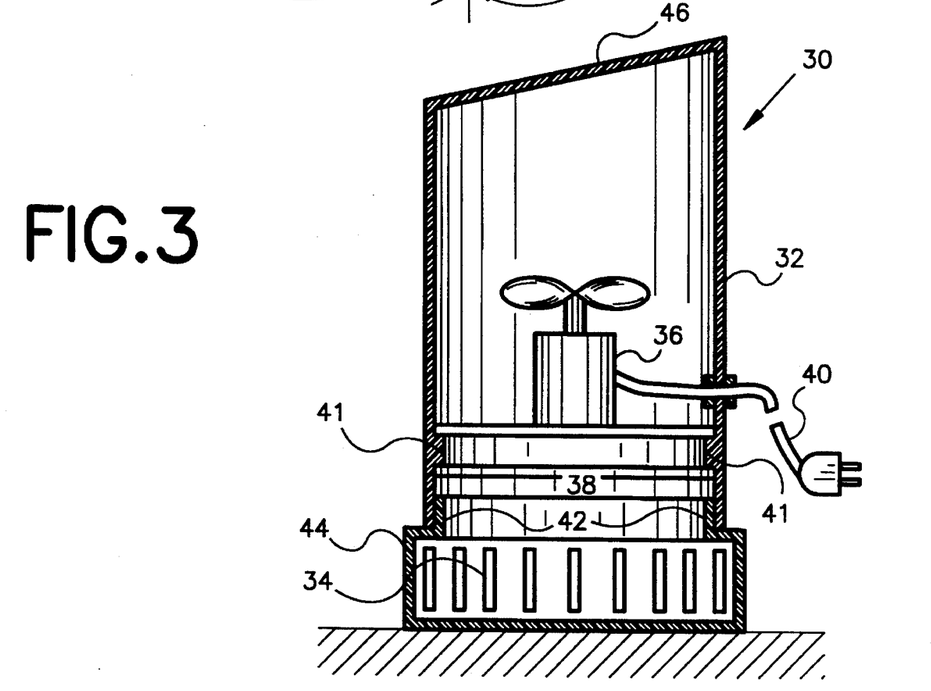
FIG. 3 is a cross-sectional elevation view of the air cleaner of FIG. 2.

Reference will now be made in detail to the preferred embodiment of the invention, which is illustrated in the accompanying drawings. With reference to FIGS. 2 and 3, an air cleaner according to an exemplary embodiment of the invention comprises a portable apparatus 30 having a housing 32. A fan 36 is suitably supported within the housing 32 to draw air from openings 34 in a lower portion 44 of the apparatus 30, through a cleaning element 38, and to direct the clean air out through openings 46 in an upper portion of the housing 32. As can best be seen in FIG. 3, lower portion or base member 44 contains a plurality of openings 34 in the form of slots arranged around the periphery thereof. Base member 44 has a reduced diameter upper portion 42 upon which cleaning element 38 rests. Upper portion 32 is designed to fit over reduced portion 42 and has an internal flange 41, the bottom edge of which bears against cleaning element 38 and the upper edge of which supports fan 36, as seen in FIG. 3. While the apparatus 30 is shown as including a power cord 40, the apparatus 30 may alternatively or additionally comprise one or more batteries for powering the fan 36.

The cleaning element 38 has a three-dimensional visco-elastic matrix of material for cleaning the air. The preferred three-dimensional visco-elastic matrix of material is a cross-linked water soluble polymer swelled with water or glycerol. The cross-linked structure prevents the three-dimensional visco-elastic matrix of material from totally dissolving or flowing but allows water to swell the gel structure between cross-linked segments. The surface energy of the three-dimensional visco-elastic matrix of material is very hydrophilic and is capable of wetting the surfaces of most airborne particles. The three-dimensional visco-elastic matrix of material is advantageously non-toxic and non-flammable.

The cleaning element 38 having the three-dimensional visco-elastic matrix of material is very effective in removing airborne particulate matter, such as dust, pollen, and tobacco smoke particles. The surface of the three-dimensional visco-elastic matrix of material is highly adhesive and removes any particulate matter that comes in contact with it via the adhesive property of the material. Because the cleaning element 38 does not physically obstruct the particulate matter but instead relies upon adhesion to remove the particulate matter from the air, the cleaning element 38 is capable of removing particulate matter of many sizes.

Figure 4A:
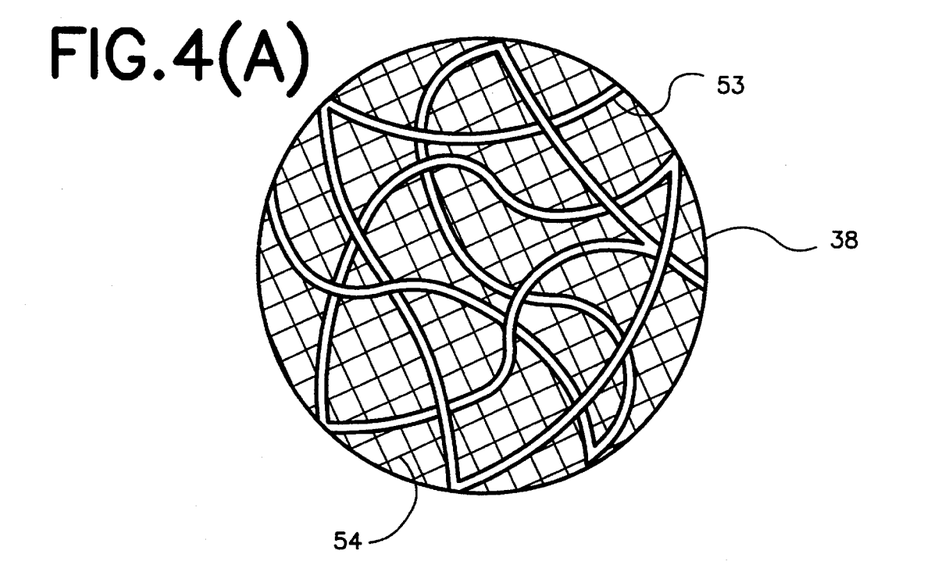
FIG. 4(A) is a top view of a cleaning element according to one embodiment of the invention.

An additional advantage over the air filter in the industry is that the cleaning element 38 with the three-dimensional visco-elastic matrix of material can easily maintain an adequate flow of air through the cleaning element 38. As shown in FIG. 4(A), an embodiment of a cleaning element 38 comprises fibers 53 of the three-dimensional visco-elastic matrix of material placed between layers of screen mesh 54. While a screen mesh 54 has been showed, other types of suitable supports, such as sheets of porous plastic, may alternatively be used.

With the cleaning element of FIG. 4(A), the fibers 53 of the three-dimensional visco-elastic matrix of material are dispersed within the cleaning element 38 at sufficient distances so that the removal of airborne particles does not result in a reduced air flow through the cleaning element 38. The cleaning element 38, which removes particulate matter by adhesion, is in contrast to the art filter element in the industry which removed airborne particles by blocking the particles in passageways formed through the filter element. Thus, unlike the air filter in the industry which would restrict the air flow as more airborne particles became blocked in the filter, the cleaning element 38 having the three-dimensional visco-elastic matrix of material does not significantly reduce the flow of air with the removal of more pollutants.

Figure 4B:
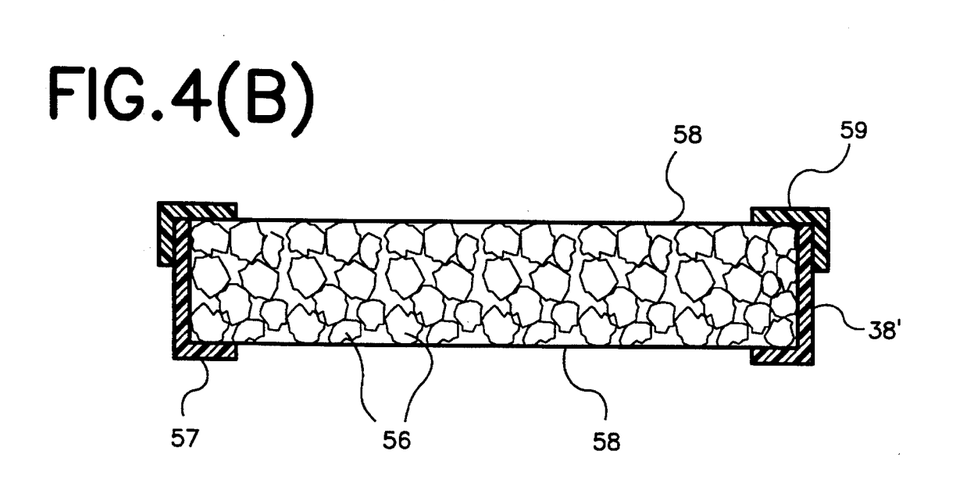
FIG. 4(B) is a cross-sectional view of a cleaning element according to a second embodiment of the invention.

While the three-dimensional visco-elastic matrix of material can clean the air without obstructing the particulate matter, the three-dimensional visco-elastic matrix of material may be placed on the cleaning element 38 so as to additionally obstruct particulate matter. For instance, as shown in FIG. 4(B), the cleaning element 38 may comprise a lower portion 57 and an upper portion 59. The cleaning element 38' may contain particles 56 of the three-dimensional visco-elastic matrix of material placed between two air permeable support structures 58. A plurality of air passages are formed through the particles 56 for blocking particulate matter in the air.

The support structures 58 maintain the particles 56 within the upper 59 and lower 57 portions and may additionally filter out part of the particulate matter. The support structures 58 may comprise a screen mesh, porous plastic, coarse paper, or other suitable material. The lower support structure 58 may advantageously be formed of polyurethane foam and the upper support structure 58 may be formed of a high efficiency particulate removal paper.

Figure 5:
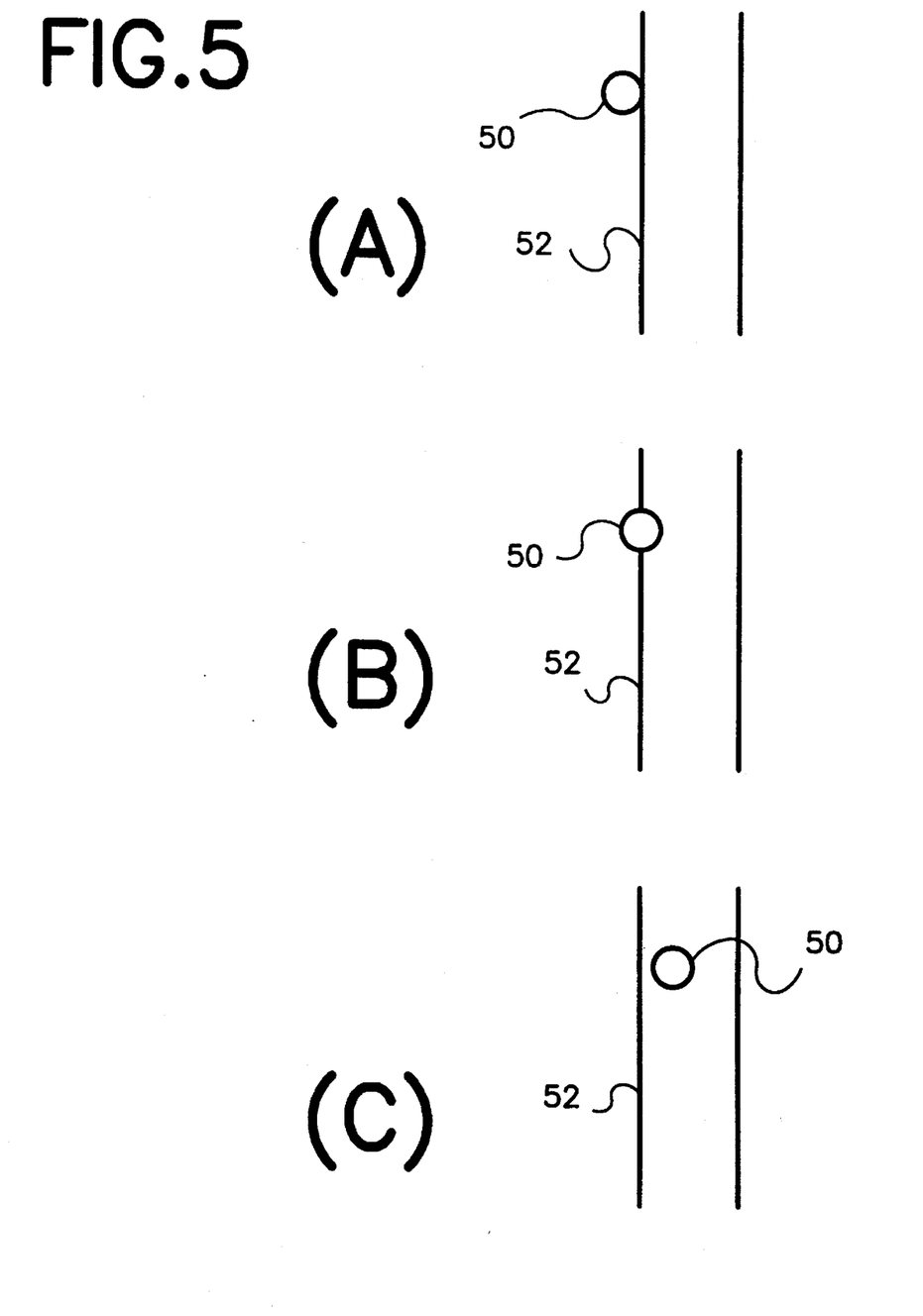
FIGS. 5(A), 5(B) and 5(C) represent the travel of a particulate matter into a three-dimensional visco-elastic matrix of material.

Another advantage of the cleaning element 38 having the three-dimensional visco-elastic matrix of material is that after airborne particles have become adhered to the surface of the material, the airborne particles become absorbed into the matrix of material. FIGS. 5(A) to 5(C) depict the process in which an airborne particle 50 becomes adhered to the surface 52 of the three-dimensional visco-elastic matrix of material and is then absorbed into the surface 52 of the material. Because the particulate matter 50 is removed from the surface 52 of the three-dimensional visco-elastic matrix of material, the surface 52 of the material becomes cleansed thereby maintaining a constant amount of surface area on the matrix that is capable of removing airborne particles 50. As a result of the self-cleansing property of the material, the three-dimensional visco-elastic matrix of material is able to remove a significantly larger amount of airborne particles 50 than prior devices.

Furthermore, the adhesive property of the surface 52 of material is effective in removing microbiological organisms from the air. As with airborne particles in general, the microbiological organisms adhere to the surface 52 of the three-dimensional visco-elastic matrix of material and are drawn down below the surface 52 thereof. Once a biological organism is drawn into the three-dimensional visco-elastic matrix of material, the three-dimensional visco-elastic matrix of material naturally inhibits the growth of the organism. To enhance the capability of the cleaning element to inhibit growth of microbiological organisms, a metallic additive, which is preferably copper sulfate, may be mixed in with the three-dimensional visco-elastic matrix of material.

In addition to being adsorptive, the filter element 38 having the three-dimensional visco-elastic matrix of material is also absorptive and is effective in removing gases, vapors, and volatile liquids, such as volatile organic compounds (VOC's). To enhance the absorptive property of the material, one or more zeolites may be added to the material. Other additives, such as alkali or alkaline earth bases and bifunctional amphoteric oxides may be used to trap phenols, creosols, and basic compounds, such as nicotine.

While the apparatus 30 has been described as one that cleans air by passing the air through a cleaning element 38, the apparatus 30 need not circulate the air through the cleaning element in order to clean the air but may instead, for instance, deflect the air off of the cleaning element 38. Since the air need not pass through the cleaning element 38, the cleaning element 38 may simply comprise a solid layer of the three-dimensional visco-elastic matrix of material upon which air is deflected.

The apparatus 30 is preferably designed so that the cleaning element 38 having the three-dimensional visco-elastic matrix of material is easily removed and replaced with a new one. The three-dimensional visco-elastic matrix of material and its additives form a transparent material which becomes discolored as pollutants from the air are removed. The need to replace a cleaning element 38 can therefore be gauged by simply looking at the color of the cleaning element 38.

Rather than relying upon a visual determination, the apparatus 30 itself may automatically determine whether the cleaning element 38 needs to be replaced. For instance, the apparatus 30 may make this determination by monitoring the amount of light passing through a portion of the material. The apparatus 30 would then provide an indication that the cleaning element 38 needs to be replaced when the amount of light passing through the material decreases to a certain amount. Alternatively, the apparatus 30 could provide the indication when a certain amount of light is reflected off of the surface of the material.

EXAMPLE

The scope of the invention is further described in connection with an example which is set forth for purposes of illustration only and is not to be construed as limiting the scope of the invention in any manner.

In one preferred embodiment, but not limited to, the components forming a three-dimensional visco-elastic matrix of material of the invention and the percent by weight of each of the components are as follows:

| Component | Percent By Weight |
| --- | --- |
| Acrylamide | 10.00 |
| N-Methylol Acrylamide (30% in Water) | 10.00 |
| Ammonium Persulfate | 0.05 |
| Glycerol | 79.50 |
| Basic composition = | 100.00 |

The N-methylol acrylamide functions as a cross-linking agent for the acrylamide polymer, the ammonium persulfate is a polymerization initiation agent, and the glycerol acts as a hydrogel plasticizer. Preferably, to further enhance the air cleaning characteristics of the three-dimensional visco-elastic matrix of material, a 7.20 percent by weight amount of Zeolite A is added to absorb volatile materials and a 7.20 percent by weight amount of Copper Sulfate is added to inhibit biological activity.

To make the three-dimensional visco-elastic matrix of material, all of the above-mentioned components are mixed together and allowed to set in a convention oven for 12 hours at 70° C. After the mixture has been cured to a gel, the three-dimensional visco-elastic matrix of material is placed in a Waring blender and dispersed to an average size of ³⁄₁₆ of an inch. The particles are then evenly poured over a screen to a thickness of ½ of an inch.

Figure 6:
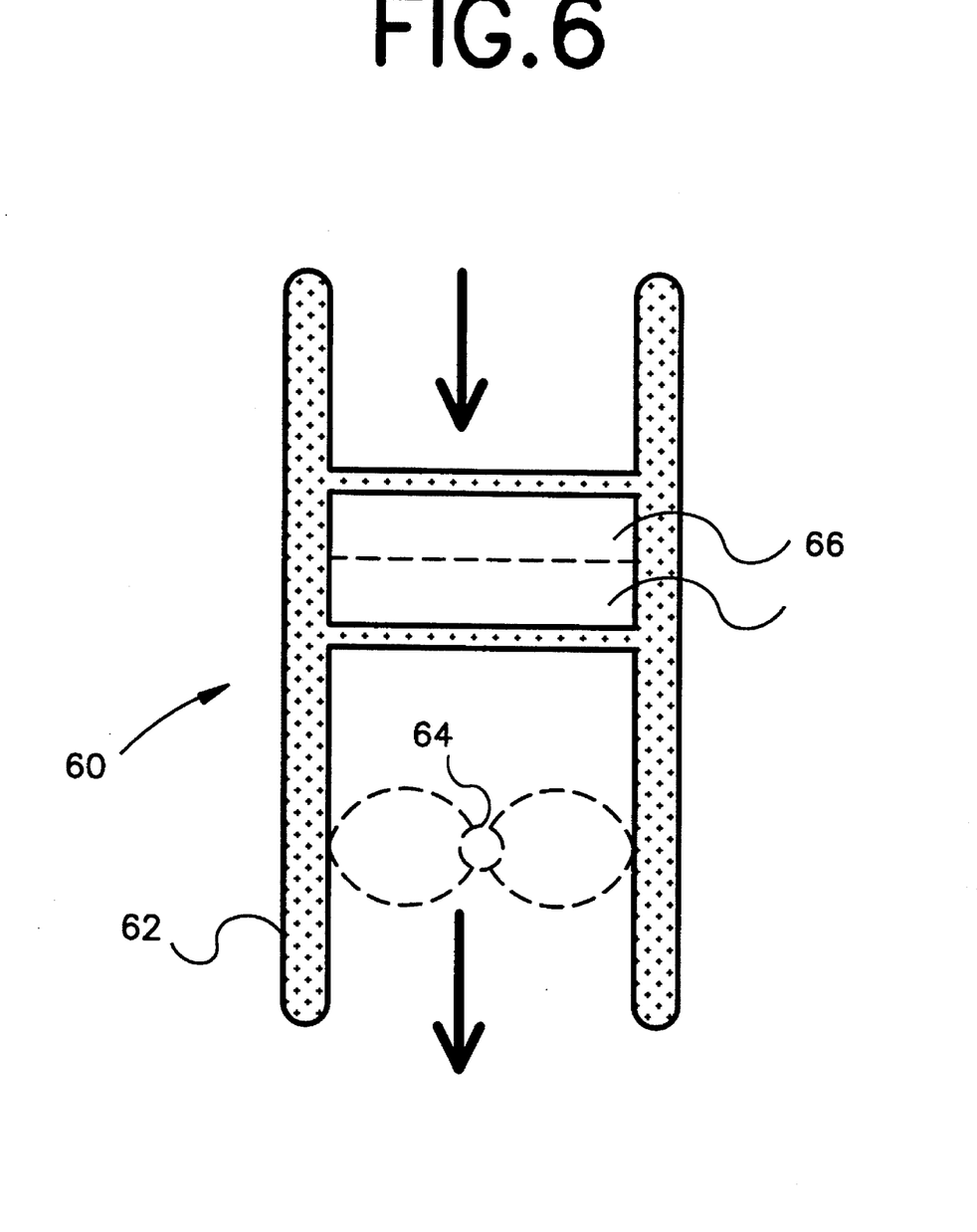
FIG. 6 is a cross-sectional view of a system for testing the performance of the three-dimensional visco-elastic matrix of material.

To evaluate the cleaning performance, with reference to FIG. 6, the three-dimensional visco-elastic matrix of material was coated on fiber beds and layers 66 of the fiber beds were placed in a square plexiglass holder 62. An air flow was induced through the layers 60 of the three-dimensional visco-elastic matrix of material with a fan 64. The particle removing capability of the system 60 was tested by placing the system 60 in a standard office measuring 12 feet by 14 feet. A Climet laser particle counter was used to monitor the concentration of the airborne particles in both respirable and non-respirable ranges. The particle counts prior to operation of the system 60 were monitored for several hours to determine the background particle counts. The operation of the system 60 was monitored every hour until the particle counts climbed back up to the initial background level.

The particle data was measured for two different ranges of particle size. The first range of sizes included particles that were greater than 0.3 microns but less than 0.5 microns and the second range of sizes included particles that were greater than 0.5 microns but less than 5.0 microns. Both ranges experienced an average reduction of 47% over a 20 day time period. The daily reductions in the amounts of particles fluctuated due to disturbances such as the cycling on and off of a heater unit.

The ability of the system 60 to remove VOC's was tested by placing the system 60 within an environmental chamber designed to simulate a typical air environment with individual control of the temperature, humidity, mixing, and air exchange rate. The inside of the chamber was 9 feet high, 8 feet wide, and 14 feet long and measured 28.5 m³. The temperature and humidity of the chamber was controlled with a Leibert air handling system at a consistent 23° C.±2° C. and 50%±5% relative humidity. The air exchange rate (ACH) was maintained at a consistent 1.01 ACH±0.05 ACH per hour. The mixing in the environmental chamber during the experiment was calculated to be nearly 100%.

The system 60 was placed in the middle of the chamber and was challenged with a mixture of ethyl acetate hexane, 1,1,1-trichloroethane, methyl ethyl ketone, sulfur hexaflouride, and methylene chloride. The gas mixture, from a certified gas cylinder in a balance of nitrogen, was injected at a steady rate of 50 ml per minute into the chamber for 24 hours and baseline concentrations were collected prior to activation of the system 60. Multisorbent tube samples were collected to determine the VOC concentrations with subsequent CC/MS analysis, a Bruel-Kjaer photoacoustical monitor determined in real-time the concentration of SFs and carbon dioxide levels, and a Climet laser particle counter monitored the respirable-sized particles.

The VOC concentrations were determined for 43 consecutive days. The results of the measurements were that the total reduction ability of the system 60 was achieved within about 5 days. The total reduction in VOC concentration was 93% and no re-emission was measured throughout the 43 day period of testing. The individual percent reduction for the various gases are as follows: 80% reduction of ethyl acetate hexane; 85% reduction of 1,1,1-trichloroethane; 80% reduction of methyl ethyl ketone; 93% reduction of sulfur hexafluoride; and 97% reduction of methylene chloride.

While the system 60 was not separately challenged with carbon dioxide, the carbon dioxide levels were monitored simultaneously with the VOC concentration measurements to determine the effect of the system 60 on carbon dioxide levels. The results of the carbon dioxide measurements show that the system 60 has no effect on carbon dioxide concentrations.

Also, while the system 60 was not separately challenged with a known concentration of particles during the measurements of VOC concentrations, the particle levels in the testing chamber were monitored to gauge the particle removal efficiency. The results revealed an average reduction of 48% for particles having a size greater than 0.3 microns and less than 0.5 microns and an average reduction of 45% for particles having a size between 0.5 microns and 5.0 microns.

Overall, the system 60 is very effective in cleaning the air. The system 60 achieved a 93% reduction in total VOC's after about 5 days of operation and achieved about a 50% reduction in airborne particles. Further, the system 60 cleans the air by adsorption and absorption and does not depend upon the prior art method of obstruction to filter the air. As a result, the system 60 easily maintains an adequate flow of air, captures particles of all sizes, and does not re-release pollutants back into the air.

While a portable apparatus 30 has been used to describe the air cleaning properties of three-dimensional visco-elastic matrix of material, the three-dimensional visco-elastic matrix of material may alternatively be used in other applications, such as in other types of devices that circulate air throughout a room or building. For instance, the three-dimensional visco-elastic matrix of material may be embodied in a filter for a window unit air conditioner or for a vehicular fan unit. Also, the three-dimensional visco-elastic matrix of material may be used in applications that focus on its adhesive properties, such as a lint collector.

Furthermore, the three-dimensional visco-elastic matrix of material is not limited to just acrylamide as the polymer but may be formed with other materials as well. For instance, the three-dimensional visco-elastic matrix of material may be formed with a siloxane, acrylate, or a cellulosic compound. The three-dimensional visco-elastic matrix of material may also be formed with other additives, such as additional zeolites other than zeolite A in order to adsorb additional gases.

The three-dimensional visco-elastic matrix of material may be placed on a cleaning element 38 in various manners. For example, the three-dimensional visco-elastic matrix of material may be simply dispersed into a plurality of particles over an area of the cleaning element 38. In a preferred manner, the three-dimensional visco-elastic matrix of material is ejected out of a nozzle to form static fibers, which are then placed over a screen or other suitable support. The fibers can be randomly oriented on the screen and need not be closely spaced in order to clean the air. The fibers of the three-dimensional visco-elastic matrix of material may be hollow or they may be formed over another fiber, such as a cotton fiber.

The foregoing description of the preferred embodiment of the invention has been presented for purposes of illustrating the features and principles thereof. It is not intended to be exhaustive or to limit the invention to the precise form disclosed. Many modifications and variations are possible in light of the above teaching. The embodiment was chosen and described in order to explain the principles of the invention and its practical application; various other possible embodiments with various modifications as are suited to the particular use are also contemplated and fall within the scope of the present invention.

We claim:

1. A method for efficiently cleaning air, comprising the steps of:

exposing a three-dimensional visco-elastic matrix of cross-linked polymer swelled with a liquid medium to air so that said three-dimensional visco-elastic matrix comes in contact with the air; and cleaning the air with said three-dimensional visco-elastic matrix.

2. The method for cleaning air as set forth in claim 1, wherein the step of cleaning the air further comprises the step of adsorbing airborne particulate matter contained in the air, thereby removing said airborne particulate matter from the air.

3. The method for cleaning air as set forth in claim 1, wherein the step of cleaning the air further comprises the step of absorbing select gases contained in the air, thereby removing said select gases from the air.

4. The method for cleaning air as set forth in claim 1, wherein the step of cleaning the air further comprises the step of absorbing select volatile liquids contained in the air, thereby removing said select volatile liquids from the air.

5. An air cleaner for efficiently cleaning air, comprising:

a cleaning element comprising a three-dimensional visco-elastic matrix of cross-linked polymer swelled with a liquid medium;

means for exposing said cleaning element to air so that said three-dimensional visco-elastic matrix comes in contact with the air;

wherein said cleaning element cleans the air coming in contact with said cleaning element.

6. The air cleaner as set forth in claim 5, wherein said three-dimensional visco-elastic matrix cleans the air by adsorbing airborne particulate matter contained in the air, thereby removing said airborne particulate matter from the air.

7. The air cleaner as set forth in claim 5, wherein said three-dimensional visco-elastic matrix cleans the air by absorbing select gases contained in the air, thereby removing said select gases from the air.

8. The air cleaner as set forth in claim 5, wherein said three-dimensional visco-elastic matrix cleans the air by absorbing select volatile liquids contained in the air, thereby removing said select volatile liquids from the air.

9. The air cleaner as set forth in claim 5, wherein said polymer comprises acrylamide.

10. The air cleaner as set forth in claim 5, wherein said polymer comprises siloxane.

11. The air cleaner as set forth in claim 5, wherein said polymer comprises acrylate.

12. The air cleaner as set forth in claim 5, wherein said polymer comprises cellulosic material.

13. The air cleaner as set forth in claim 5, wherein said three-dimensional visco-elastic matrix further comprises a zeolite.

14. The air cleaner as set forth in claim 5, wherein said three-dimensional visco-elastic matrix further comprises a metallic additive to inhibit biological activity.

15. The air cleaner as set forth in claim 5, wherein said cleaning element contains fibers of said polymer and said exposing means forces air through said cleaning element in order to clean the air.

16. The air cleaner as set forth in claim 5, wherein said cleaning element contains particles of said polymer and said exposing means forces air through said cleaning element in order to clean the air.

17. The air cleaner as set forth in claim 5, wherein said liquid medium is water.

18. The air cleaner as set forth in claim 5, wherein said liquid medium is glycerol.

19. A cleaning element for placement in an air cleaner for efficiently cleaning air, comprising:

fibers formed from a cross-linked polymer swelled with a liquid medium; and a support for holding said fibers.

20. The cleaning element of claim 19, wherein said liquid medium is water.

21. The cleaning element of claim 19, wherein said liquid medium is glycerol.

22. The cleaning element of claim 19 wherein said polymer comprises about 10% by weight acrylamide, about 10% by weight cross-linking agent, about 0.05% by weight polymerization initiation reagent and about 79.5% by weight glycerol.

23. The cleaning element of claim 22, further comprising about 7.2% by weight zeolite A and about 7.2% by weight copper sulfate.

* * * * *